(12) United States Patent
Goldberg et al.

(10) Patent No.: US 11,843,570 B2
(45) Date of Patent: *Dec. 12, 2023

(54) SECURITY AND PREVENTION OF INFORMATION HARVESTING FROM USER INTERFACES

(71) Applicant: International Business Machines Corporation, Armonk, NY (US)

(72) Inventors: Itzhack Goldberg, Hadera (IL); Bruce A. Kahn, Hudson, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1230 days.

This patent is subject to a terminal disclaimer.

(21) Appl. No.: 15/222,611

(22) Filed: Jul. 28, 2016

(65) Prior Publication Data

US 2018/0034761 A1    Feb. 1, 2018

(51) Int. Cl.
*H04L 51/42* (2022.01)
*H04L 51/48* (2022.01)
*H04L 67/02* (2022.01)

(52) U.S. Cl.
CPC .............. *H04L 51/42* (2022.05); *H04L 51/48* (2022.05); *H04L 67/02* (2013.01)

(58) Field of Classification Search
CPC ......... H04L 51/22; H04L 51/28; H04L 67/02; H04L 51/42; H04L 51/12
USPC ....................................................... 709/206
See application file for complete search history.

(56) References Cited

U.S. PATENT DOCUMENTS

| | | | |
|---|---|---|---|
| 7,747,602 B2 * | 6/2010 | Sampson | G06F 17/3089 707/708 |
| 9,306,881 B1 | 4/2016 | Ahuja et al. | |
| 9,424,556 B2 * | 8/2016 | Ollila | G06Q 10/10 |
| 2003/0038820 A1 | 2/2003 | Purpura | |
| 2009/0049392 A1 * | 2/2009 | Karttunen | G06Q 10/10 715/762 |
| 2009/0055484 A1 * | 2/2009 | Vuong | G06Q 10/107 709/206 |
| 2011/0302509 A1 * | 12/2011 | Leacock | G06Q 10/10 715/756 |
| 2013/0290435 A1 * | 10/2013 | Martin | H04L 51/28 709/206 |
| 2013/0290436 A1 * | 10/2013 | Martin | G06Q 10/107 709/206 |

(Continued)

OTHER PUBLICATIONS

IBM: List of IBM Patents or Patent Applications Treated as Related, 2 pg.

(Continued)

*Primary Examiner* — Kristie D Shingles
(74) *Attorney, Agent, or Firm* — CUENOT, FORSYTHE & KIM, LLC (57) ABSTRACT

Securing information within a user interface can include mapping, using a processor, an electronic mail address to an avatar, wherein the mapped electronic mail address and the avatar are stored within a data storage device, and generating, using the processor, a user interface including a message correlated with the electronic mail address. The user interface displays the avatar of the electronic mail address in place of at least one of a name for the electronic mail address or the electronic mail address.

11 Claims, 5 Drawing Sheets

(56) References Cited

U.S. PATENT DOCUMENTS

| | | | | |
|---|---|---|---|---|
| 2013/0333047 | A1* | 12/2013 | Gibson | G06Q 10/107 |
| | | | | 726/26 |
| 2014/0201527 | A1 | 7/2014 | Krivorot | |
| 2015/0067500 | A1* | 3/2015 | Lee | G06F 9/453 |
| | | | | 715/706 |
| 2016/0012465 | A1* | 1/2016 | Sharp | G06Q 20/18 |
| | | | | 705/14.17 |
| 2016/0080291 | A1* | 3/2016 | Caliendo, Jr. | H04L 51/28 |
| | | | | 709/206 |
| 2016/0125371 | A1 | 5/2016 | Grassadonia et al. | |
| 2016/0294750 | A1* | 10/2016 | Ansari | G06F 3/0485 |
| 2017/0346772 | A1* | 11/2017 | Albouyeh | H04L 51/52 |
| 2018/0069819 | A1 | 3/2018 | Goldberg et al. | |
| 2018/0088787 | A1* | 3/2018 | Bereza | G06F 3/04883 |

OTHER PUBLICATIONS

Goldberg, I. et al., "Security and Prevention of Information Harvesting From User Interfaces," U.S. Appl. No. 15/811,696, filed Nov. 14, 2017, 34 pages.

\* cited by examiner

SECURITY AND PREVENTION OF INFORMATION HARVESTING FROM USER INTERFACES

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to information security and, more particularly, to preventing the gathering of information from user interfaces. Modern messaging clients typically display a variety of information relating to the sender(s) and/or recipient(s) of messages. For example, an electronic mail (email) client usually displays the name or email address of the sender and/or recipient(s) of an email. This information is displayed within an open email and also within records of emails displayed within a list such as in the inbox, the sent email folder, etc., of the email client.

One way to collect email addresses and/or names of another's associates is to simply look over the shoulder of the user at the display of the user's computing system while that user utilizes a messaging client. An observer can easily see the names and/or email addresses of persons with whom the user corresponds. Another way to collect email addresses and/or names is through the use of malware that is configured to capture screen shots of messaging clients. The screen shots include the email addresses and/or names of persons with whom the user corresponds. Having the name and/or email address of a person is often sufficient to gain greater information about the person through techniques such as social engineering, phishing campaigns, etc.

Available security measures attempt to protect user information in a variety of ways. One technique, for example, attempts to obscure data on the user's display screen. The user must wear specialized glasses to see the content. This technique may be defeated, however, if an observer simply wears the same glasses as the user. Another technique scrambles the textual content of a message. While this technique may protect the body of a message, the names and/or email addresses of senders and recipients of messages are not protected.

SUMMARY

An embodiment of the present invention may include a computer-implemented method of securing information. The method may include mapping, using a processor, an electronic mail (email) address to an avatar, wherein the mapped email address and avatar are stored within a data storage device. The method may also include generating, using the processor, a user interface including a message correlated with the email address, wherein the user interface displays the avatar of the email address in place of at least one of a name for the email address or the email address.

In accordance with the example embodiments disclosed herein, avatars may be associated with email addresses and used in place of the email addresses and/or names within user interfaces. Personal information such as the names of senders and/or recipients of messages and email addresses of senders and/or recipients of messages are unavailable within user interfaces for observance by third parties or other observers in order to protect and secure such information. Messages may be processed to utilize and display the avatars in lieu of displaying email addresses and/or names as may be determined from header information of the message.

The method may include, responsive to a user input, displaying at least one of the name of the user of the email address or the email address.

For example, since information such as correspondent information is not initially displayed, additional information such as the email address and/or name (e.g., correspondent data) may be provided upon request such as for purposes of clarification, to resolve ambiguity, and so forth.

In a further aspect, a plurality of email mail addresses are mapped to a plurality of avatars. In that case, the method can include, responsive to receiving user input specifying a recipient of a message, determining email addresses matching the received user input and displaying only the avatar of each matching email address in lieu of displaying correspondent data for each matching email address.

For example, in cases where a user types a name and/or email address into an address field of a user interface, avatars determined to match the received user input may be displayed in lieu of the matching names and/or email addresses. This protects personal information such as the persons with whom a user corresponds. Still, the user creating the message will recognize the avatars in order to select which email address to use by way of avatar selection.

In one or more example implementations, characters of the user input are not displayed. By not displaying the characters of a received user input specifying an intended recipient of a message, which is performed by conventional messaging systems, the names and/or email addresses that may be entered by the user are protected. For example, as the user input is typed into the user interface, the particular characters specified are not displayed. Only those avatars found to match the received input, for example, are displayed.

In yet another aspect, the user interface displays the message opened. Accordingly, each email address correlated with the message is represented using only the avatar for the email address.

For example, while viewing a message, the email addresses and/or names of senders and/or recipients are not displayed. The avatars, which are recognizable by the user reading and/or viewing the message, are shown in place of the correspondent data. To one other than the user of the messaging system, the avatars are not indicative of the senders and/or recipients of messages.

The user interface may display a plurality of records for messages arranged in a list, wherein for each record, at least one of a sender or a recipient is specified using only an avatar for an email address of the sender or recipient.

For example, while viewing a list of messages in a folder or inbox, the email addresses and/or names of senders and/or recipients are not displayed. Instead, the avatars, which are recognizable by the user reading and/or viewing the messages, are shown. As noted, one other than the user of the messaging system would not be able to discern the senders and/or recipients of messages from viewing the avatars.

The method may include first determining that the email address correlated with the message is not mapped to an avatar, and responsive to the determining, performing the mapping by generating an avatar based on at least one of the email address or a name for the email address, and using the generated avatar for the email address.

For example, in cases where email addresses are not mapped to an avatar, an avatar may be dynamically generated and displayed. The avatar may be dynamically generated in real time as needed for those email addresses not mapped to any avatar by the user of the messaging system.

Another embodiment of the present invention may include a system having a processor programmed to initiate executable operations for securing information as described herein.

Another embodiment of the present invention may include a computer program including a computer readable storage medium having program code stored thereon. The program code is executable by a processor to perform one or more methods relating to securing information as described herein.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to information security and, more particularly, to preventing the gathering of information from user interfaces. In accordance with the example embodiments described herein, a messaging device is capable of generating and displaying user interfaces (UIs), e.g., graphical user interfaces (GUIs), configured to prevent parties from gathering personal information of the user. In one example embodiment, selected items of information such as electronic mail (email) addresses are correlated with avatars. In one aspect, the particular avatars associated with email addresses may be selected by a user of the messaging device and, as such, are specific to the user of the messaging device. The messaging device uses the avatars within the generated UIs in lieu of textual versions of the data items represented by the avatars.

By utilizing the avatars in place of the textual data items, e.g., email addresses and/or names, parties other than the user of a messaging system are unable to determine the name and/or email address of senders and/or recipients of messages by looking at the UI of the messaging system. Further, screen capture malware is only able to capture images of avatars, rather than text names and/or email addresses, thereby protecting the email addresses and/or names of senders and/or recipients of messages.

Figure 1:
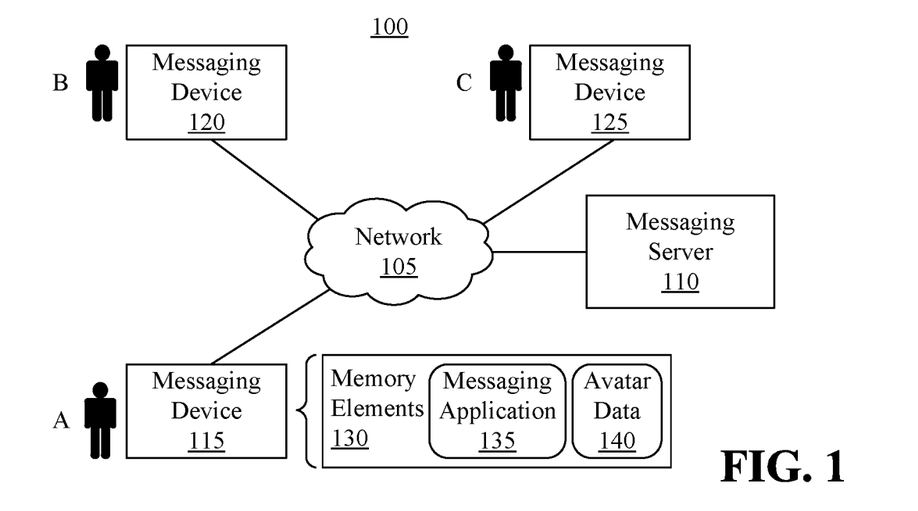
FIG. 1 illustrates an example network computing system.

FIG. 1 is a block diagram illustrating an example of a network computing system 100 in which the inventive arrangements may be implemented. Network computing system 100 contains a network 105, a messaging server 110, and one or more messaging devices (devices) such as devices 115, 120, and 125. Each of messaging server 110 and devices 115, 120, and 125 is coupled to network 105. One or more other systems, services, data storage devices, and so forth, (not shown) may optionally be coupled to network 105 as well.

Network 105 is the medium used to provide communications links between various devices and data processing systems connected together within network computing system 100. Network 105 may include connections, such as wired communication links, wireless communication links, fiber optic cables, and so forth. Network 105 may be implemented as, or include, any of a variety of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), etc.

Messaging server 110 may be implemented as one or more data processing systems, e.g., servers, executing suitable operational software to support the exchange of messages among devices 115, 120, and 125. Devices 115, 120, and 125 each may be implemented as a data processing system. For example, devices 115, 120, and/or 125 may be implemented as personal computers, portable devices, network computers, tablet computers, mobile phones, combinations thereof, and so forth. Devices 115, 120, and 125 may communicate with messaging server 110 in order to exchange messages among one another.

In one embodiment, messaging server 110 is capable of performing operations such as instant message handling and delivery. In another embodiment, messaging server 110 is capable of performing operations such as email handling and delivery. In still another embodiment, messaging server 110 is capable of performing operations such as posting messages for a Website or other Internet based forum or community. Messaging server 110 may be implemented as a standalone system or as a component within a larger system. For example, messaging server 110 may be a component of a social networking platform or other communication system.

In the example of FIG. 1, device 115 contains memory elements 130. Memory elements 130 are capable of storing operational software such as an operating system (not shown) and a messaging application 135. Further, memory elements 130 are capable of storing avatar data 140. Avatar data 140 may be stored separately from messaging application 135 or may be considered part of messaging application 135. Avatar data 140 includes one or more avatar-email address pairs (hereafter "pairs").

In order to differentiate between different email addresses that a single user may have, device 115 is capable of assigning different avatars to any individual email address of a user. In one example, within avatar data 140, each email address may be associated with a single, unique avatar resulting in a one-to-one correspondence between avatars and email addresses. In that case, a user or contact record that has more than one email address may, or will, have one avatar for each email address. Unlike an image for a contact record that is used for each email address of the contact, each avatar within avatar data 140 may be assigned to one email address.

An avatar for an email address may be obtained from any of a variety of different sources. Example sources include a corporate directory, the contact record for a user in a contact management application, from a social networking platform, etc. It one or more other embodiments, as will be described herein in greater detail, a same avatar may be used or assigned to more than one email address across more than one user.

In one embodiment, the user of a device creates the pairs. For example, user A, who is the user of device 115, specifies the avatar-email address pairs of avatar data 140. Thus, each pair within avatar data 140 is specified by user A. Consider an example where an email address for user B is part of a pair within avatar data 140. In that case, the avatar assigned to the email address of user B within avatar data 140 is entirely independent, and may be completely different, from the avatar assigned to the email address of user B within avatar data stored within device 125 as specified by user C. In one example embodiment, the device is capable of allowing a user to associate any avatar the user wishes with any email address. In another example embodiment, the device is capable of allowing a user to use any avatar as a default avatar for an email contact with any number of email addresses and/or for one or more email addresses belonging to a same domain.

In executing messaging application 135, device 115 is capable of generating one or more UIs in which the avatars are incorporated or used in place of correspondent data. For purposes of description and ease of illustration, the term "correspondent data," within this disclosure, means one or more email addresses, one or more names, or a combination of one or more email addresses and one or more names. For example, rather than displaying the email address of a sender or a recipient of an email, the UI of messaging application 135 displays the avatar for the email address in place of the email address. The email address and/or name associated with the avatar is not displayed. Thus, an onlooker of user A's display would see, or a screen shot of user A's display screen would reveal, only avatars. The correspondent data for messages within the UIs on user A's display screen are not displayed and is protected since the onlooker has no information as to which avatar may correspond to which email address.

FIG. 1 is provided for purposes of illustration and is not intended to limit the inventive arrangements described herein. It should be appreciated that network computing system 100 may include fewer elements than shown or more elements such as additional servers, clients, and other devices.

The example embodiments described herein are discussed in the context of a messaging application executing on a device. It should be appreciated that the example embodiments described herein may also be applied to Web-based email systems where the user utilizes a browser to accesses a particular email server or email system and receives a Web-page or Web-pages. Thus, in another embodiment, the messaging device is the computer system of a user executing a browser that renders the Web-pages received from the email server and/or system. In still another embodiment, the messaging device is the messaging server configured to generate and/or send Web-pages or other markup language to devices that, when rendered by a browser executing on the device, generates the UIs described herein.

Figure 2:
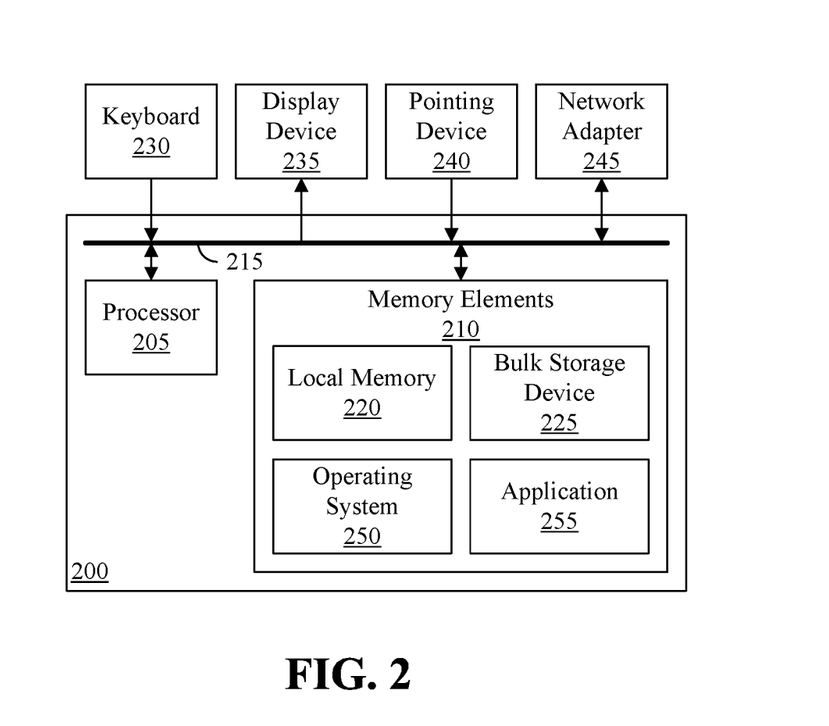
FIG. 2 illustrates an example architecture for a data processing system.

FIG. 2 is a block diagram illustrating an exemplary architecture 200 for a data processing system. Architecture 200 may be used to implement a computer that is suitable for storing and/or executing program code. In one aspect, for example, architecture 200 may be used to implement messaging server 110 of FIG. 1 and/or a messaging system. In another aspect, architecture 200 may be used to implement device 115, 120, and/or 125.

Architecture 200 includes at least one processor 205, e.g., a central processing unit (CPU), coupled to memory elements 210 through a system bus 215 or other suitable circuitry. Architecture 200 stores program code within memory elements 210. Processor 205 executes the program code accessed from memory elements 210 via system bus 215. In one aspect, architecture 200 may be used to implement a computer or other data processing system that is suitable for storing and/or executing program code. It should be appreciated, however, that architecture 200 may be used to implement any system including a processor and memory that is capable of performing the functions described within this disclosure.

Memory elements 210 include one or more physical memory devices such as, for example, a local memory 220 and one or more bulk storage devices 225. Local memory 220 may be implemented as a random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 also may include one or more cache memories (not shown) that provide temporary storage of at least some program code in order to reduce the number of times program code must be retrieved from the bulk storage device during execution.

Input/output (I/O) devices such as a keyboard 230, a display device 235, and a pointing device 240 optionally may be coupled to architecture 200. The I/O devices may be coupled to architecture 200 either directly or through intervening I/O controllers. A network adapter 245 may also be coupled to architecture 200 to enable a system implemented using architecture 200 to become coupled to other systems, computer systems, remote printers, and/or remote storage devices through intervening private or public networks. Modems, cable modems, Ethernet cards, and wireless transceivers are examples of different types of network adapter 245 that may be used with architecture 200.

Memory elements 210 store an operating system 250 and an application 255. Operating system and application 255, being implemented in the form of executable program code, are executed by architecture 200. In one example, application 255 is a messaging application. Operating system 250 and/or application 255 may be considered an integrated part of any system implemented using architecture 200. Application 255 and any data items used, generated, and/or operated upon by architecture 200 while executing application 255 are functional data structures that impart functionality when employed as part of architecture 200.

In the case where architecture 200 is used to implement messaging server 110 of FIG. 1, operating system 250 may be a server-side operating system; and, application 255 may be a server-side application that, when executed, causes the server to perform the various operations described herein. In the case where architecture 200 is used to implement a device of FIG. 1, operating system 250 may be a client-side operating system; and, application 255 may be a client-side application that, when executed, causes the client to perform the various operations described herein.

For purposes of description, a device that performs the operations described herein, whether a client device of a user or a server of a Web-based email system that serves Webpages to client devices, is referred to as a "messaging system."

Figure 3:
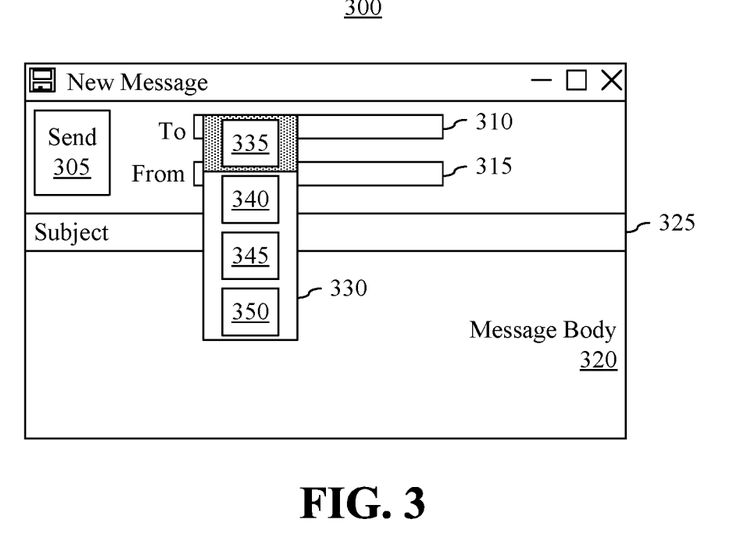
FIG. 3 illustrates an example graphical user interface (GUI) for a messaging system.

FIG. 3 illustrates an example graphical user interface (GUI) 300 for a messaging system. In one example embodiment, GUI 300 is generated and displayed by a client device such as client 115 of FIG. 1. In another example embodiment, GUI 300 is specified using markup language, provided by a messaging server, and rendered using a client device, e.g., using a browser.

In the example of FIG. 3, a user such as user A, using a messaging system, has activated a control or otherwise requested creation of a new email message, thereby causing GUI 300 to be generated and displayed. GUI 300 includes a "send" button 305, optionally a "To" field 310, optionally a "From" field 315, a message body 320, a subject section 325, and a list 330 of avatars. At least initially, list 330 is not displayed. The example avatars in list 330 include avatars 335, 340, 345, and 350.

In one example embodiment, the user may begin typing characters of a name and/or email address of a recipient in field 310. As the characters are received by the messaging system, the characters are not displayed within GUI 300 (e.g., are not shown in field 310). Instead, the characters typed by the user are stored internally, e.g., cached, or provided to a messaging server as the case may be and used to search for matching avatars. For example, for each letter or other character received, the messaging system continues to build correspondent data that may be used to search within contact records, email address lists, and/or avatar data 140. As the messaging system determines matches, the avatars associated with the matching correspondent data are displayed as avatars 335-350 within list 330.

As an illustrative example, a user may begin to type the character string "joe" into field 310 to specify a recipient of the message being created. The messaging system, responsive to receiving the characters within field 310, does not display any of the characters "j," "o," or "e" within field 310 or elsewhere within GUI 300. The messaging system searches for correspondent data that match the characters "joe." Responsive to determining matching correspondent data, the messaging system displays the avatars for the matching correspondent data as avatars 335-350 within list 330.

In the example of FIG. 3, the user has selected avatar 335 as indicated by the shading. Responsive to selecting avatar 335, the messaging system displays avatar 335 next to the "To" label in lieu of displaying the correspondent data. In one embodiment, the messaging system displays avatar 335 in place of field 310. It should be appreciated, however, that the user may continue to specify additional recipients of the message by repeating the described process. For each recipient specified, the messaging system displays the avatar for the recipient in lieu of the name and/or the email address of the recipient. Though the avatar of the selected recipient is displayed, the email is generated as a conventional email in that the header of the email (which is not displayed unless by request of a user) will include the recipient's email address(es). In this manner, a different messaging system that does not perform the security related operations described herein may still display and/or otherwise process the email.

In another example embodiment, the "From" label and field 315 may be omitted from GUI 300. For example, the messaging system may default to using the email address of the user for the particular email account from which the email is to be sent. To the extent that information about the sender may be displayed, if at all, the avatar for the sending email address may be displayed.

An onlooker viewing GUI 300 or screen shots captured via malware on a messaging system would be unable to discern the names and/or email addresses mapped with the avatars shown. The use of avatars as illustrated effectively anonymizes names and/or email addresses of senders and/or recipients of messages. Such is the case as the avatars may be mapped to email addresses by the user of the messaging system so that any other user would not know the name and/or email addresses for the avatars shown.

Figure 4:
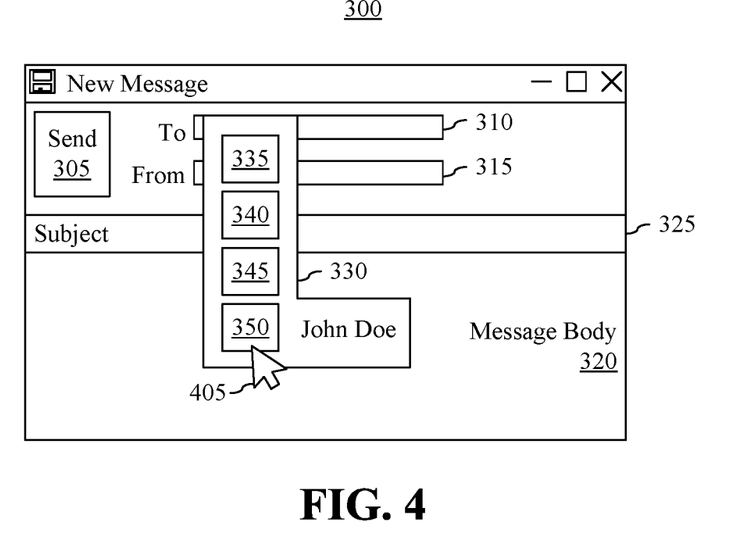
FIG. 4 illustrates the GUI of FIG. 3 in a different operating state.

FIG. 4 illustrates GUI 300 in a different operating state. In the example of FIG. 4, a user controlled pointer 405 is hovering above avatar 350. Responsive to the user hovering over an avatar for a predetermined amount of time, in this case avatar 350, the messaging system interprets the hover action as a user request for additional information about avatar 350. Responsive to the hover operation, the messaging system provides the name associated with avatar 350, which is "John Doe" in this example. Thus, responsive to a user request for additional information, the messaging system may display the name of the user paired with the avatar (by way of the email address, for example). In another embodiment, the messaging system may display the email address associated with the avatar responsive to a user request for additional information.

In one example, responsive to termination of the user request, e.g., termination of the hover operation, the messaging system removes the correspondent data from list 330 and/or from GUI 300. In another example, the messaging system may display the correspondent data for a predetermined amount of time and, upon expiration of that amount to time, remove the correspondent data.

Figure 5:
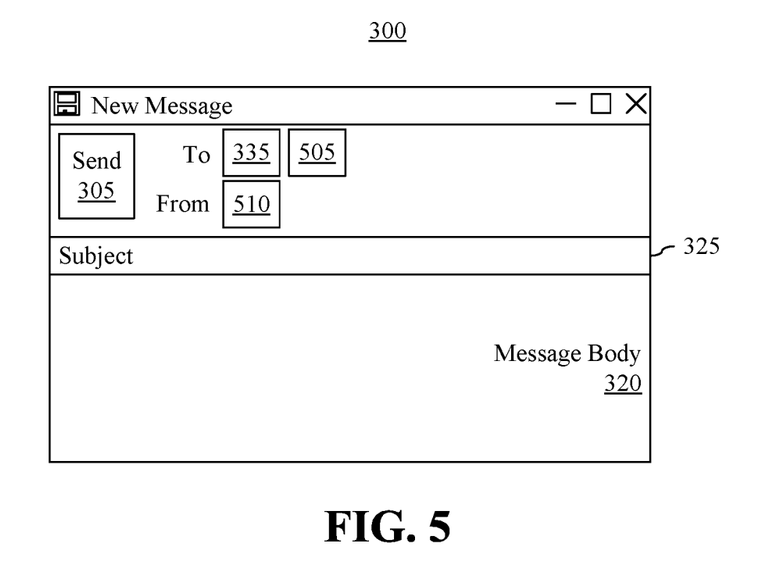
FIG. 5 illustrates the GUI of FIG. 3 in another different operating state.

FIG. 5 illustrates GUI 300 in another different operating state. In the example of FIG. 5, the recipients of the email being created have been fully specified. Header information for the email includes the recipient(s) and sender email addresses. GUI 300 does not display the email addresses and names. As pictured, the messaging system displays avatars in place of email addresses and/or names. Thus, recipient email addresses are represented using only avatars 335 and 505, as selected by the user of the messaging system. In this example, avatar 510 is displayed representing the sender email address. As discussed, in one or more embodiments, the messaging system may omit the "From" label and avatar representing the sender email address from GUI 300.

Figure 6:
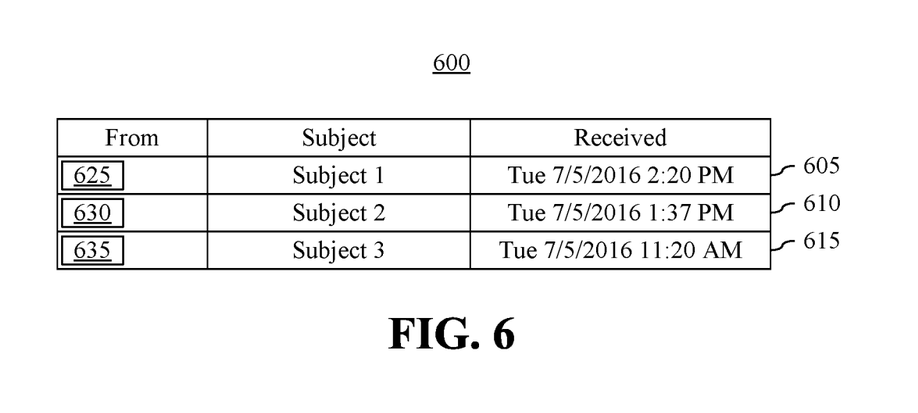
FIG. 6 illustrates another example GUI for a messaging system.

FIG. 6 illustrates another example GUI 600 for a messaging system. GUI 600, for example, may be generated and displayed by a client device such as client 115 of FIG. 1. In another example, GUI 600 may be generated by a messaging server. In the example of FIG. 6, the messaging system is displaying a list of messages. The messages may be emails. In one example embodiment, GUI 600 may be an inbox view or the view of another folder of emails for a messaging system. As pictured, GUI 600 shows email records 605, 610, and 615 for three emails. GUI 600 includes column headings of "From," "Subject," and "Received." In the "From" column, correspondent data for the senders are not displayed. In place of correspondent data, the messaging system displays the avatar paired with the sender email address for each of email records (or emails) 605, 610, and 615. Thus, email record 605 displays avatar 625 in the "From" column. Email record 610 displays avatar 630 in the "From" column. Email record 615 displays avatar 635 in the "From" column.

It should be appreciated that a GUI similar to that of GUI 600 may be used for a "sent" folder. In that case, the messaging system may generate and/or display a GUI that includes a "To" column where avatars paired with the email address of the recipient(s) are displayed in place of the correspondent data of the recipients. In one embodiment, a GUI such as GUI 600 displays no sender and/or receiver names and/or email addresses and, in place of the names and/or email addresses, displays the avatar associated with the relevant email address.

Figure 7:
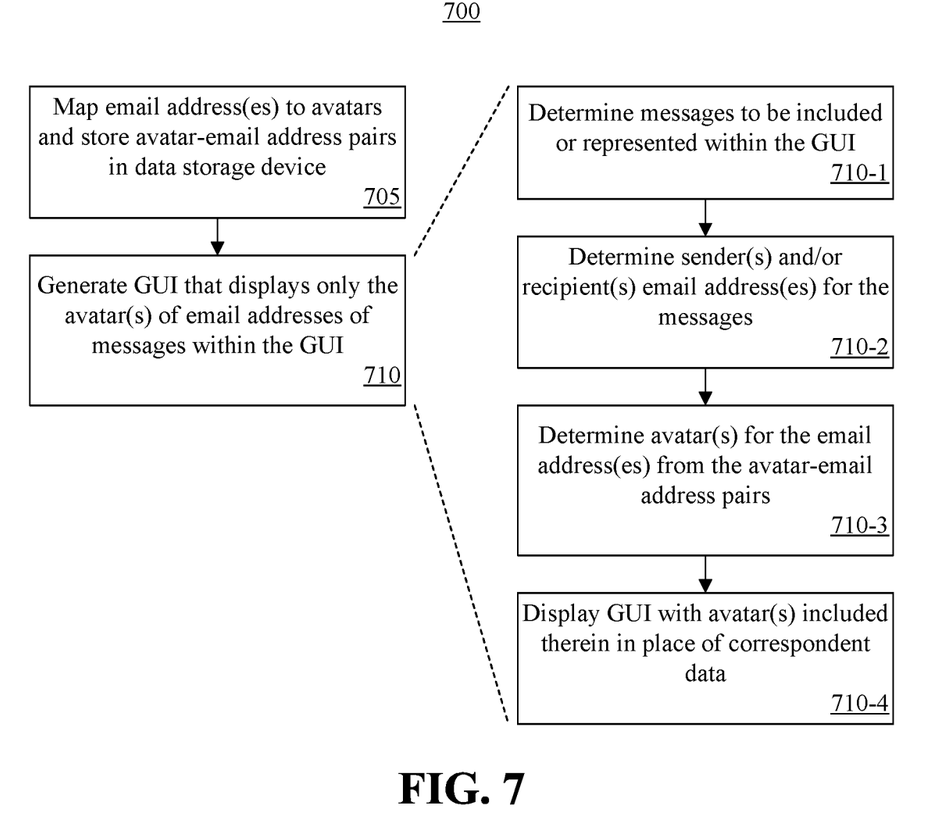
FIG. 7 illustrates an example method of operation for a messaging system.

FIG. 7 illustrates an example method 700 of operation for a messaging system. Method 700 illustrates a general method of operation for a messaging system using avatars in place of selected items of correspondent data. In one embodiment, method 700 may be performed by a client such as client 115 of FIG. 1 executing a messaging application or another suitable or similar communication device. In another embodiment, method 700 may be performed by a messaging server by way of generating and sending markup language to a client device.

In block 705, the messaging system maps one or more electronic mail addresses to avatars. The mapped avatar-email address pairs are stored in a data storage device of the messaging system. For example, the messaging system is capable of receiving an avatar as a user input for a selected email address. The messaging system creates an association, or mapping, between the avatar and the email address. For example, the messaging system generates an avatar-email address pair that is stored within a list of such pairs in memory elements of the messaging system for subsequent recall. In one example embodiment, an avatar may be paired with only a single email address.

In block 710, the messaging system is capable of generating a GUI. The GUI includes a message and/or a record representing the message. In one example, the message is an email. In generating the GUI, the client displays only the avatar of the email address in lieu of displaying the email address itself within the GUI.

For purposes of illustration, block 710 is further broken down into additional operations that may be performed to generate the GUI. In one aspect, the messaging system may generate the GUI responsive to a user input such as a user selection of a particular view within the messaging client, a user selection of a message to edit, view, or file, and so forth. In another aspect, the messaging system may generate the GUI as part of a startup or default view responsive to execution of the messaging application.

In block 710-1, the messaging system is capable of determining the particular messages that are to be included or at least represented within the GUI. For example, the client may determine the particular messages that are to be displayed within the GUI or represented using records within the GUI depending upon the type of GUI that is being generated.

In block 710-2, the messaging system is capable of determining the particular data items, e.g., recipient(s) and/or sender(s), that are to be represented for each message determined in block 710-1 to be included within the GUI. For example, each email message that is selected for display in the GUI includes header information that includes the actual email addresses for sender(s) and/or recipient(s). The header information may remain unchanged and may be parsed or otherwise evaluated by the messaging system. Thus, for each email message, the client is capable of determining the sender(s) and recipient(s) email address(s).

In block 710-3, the messaging system determines the avatar(s) for each message to be included within the GUI from the list of pairs. In cases where an email address is not found within the list of pairs, the messaging system may utilize a default avatar, an image that is saved as part of a contact record including the email address, or a default avatar assigned to the domain of the email address.

In block 710-4, the messaging system displays the GUI with the avatar(s) included therein in place of the correspondent data for sender(s) and/or recipient(s) as the case may be. For example, the client is capable of generating and displaying a GUI as illustrated in any one of FIGS. 3, 4, 5 and/or 6.

Figure 8:
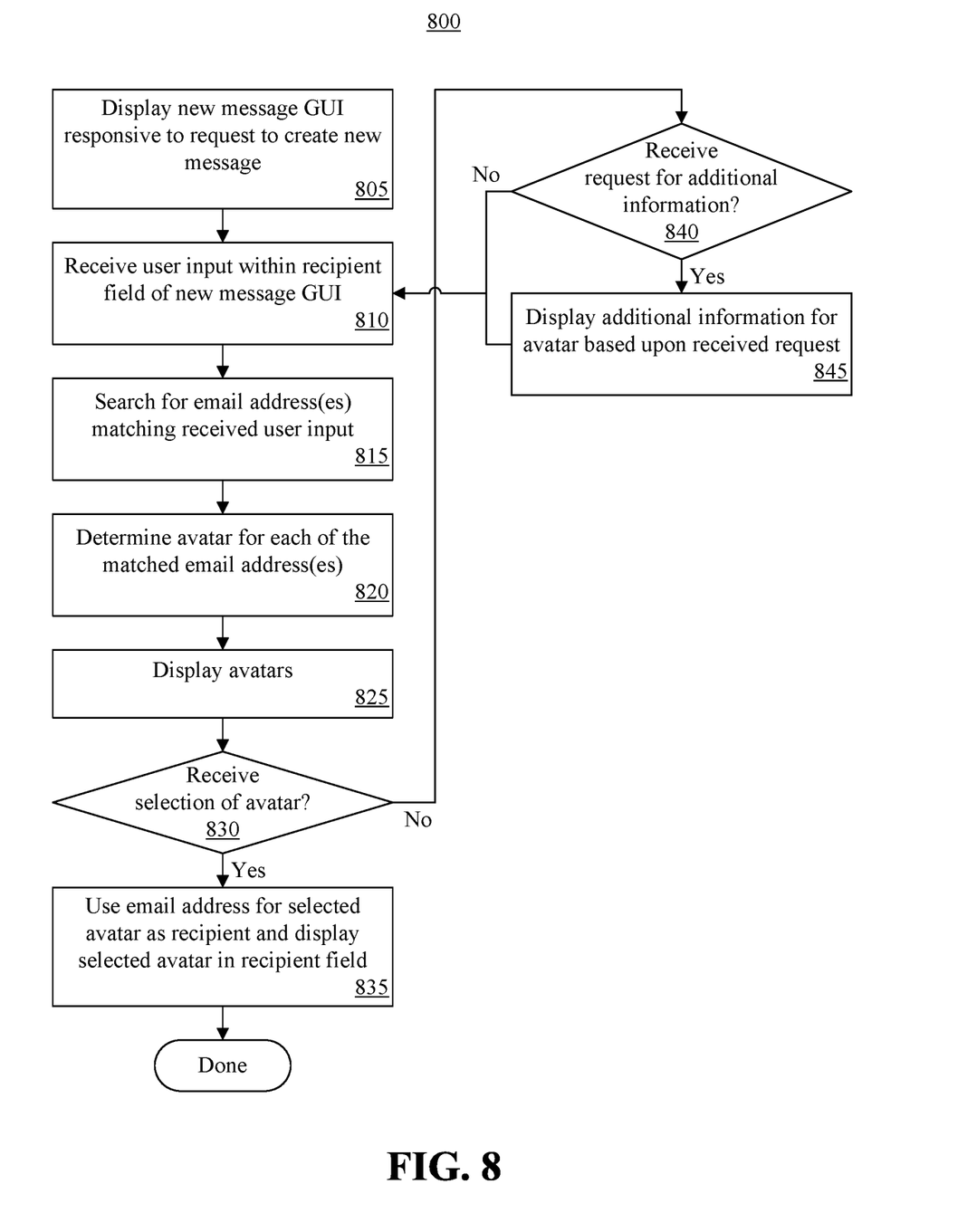
FIG. 8 illustrates another example method of operation for a messaging system.

FIG. 8 illustrates another example method 800 of operation for a messaging system. Method 800 illustrates a method of operation for a client device using avatars in place of selected items of personal information for composing a message. In one embodiment, method 800 may be performed by a client such as client 115 of FIG. 1 executing a messaging application or another suitable or similar communication device. In another embodiment, method 800 may be performed by a messaging server by way of generating and sending markup language to a client device.

In block 805, the messaging system displays a new message GUI responsive to a request to create a new message. For example, in response to a user request to create a new email, the messaging system may display a GUI such as GUI 300. At least initially, list 330 is not displayed within or as part of or with GUI 300. In one example embodiment, the messaging system may display an avatar for the sender. The avatar for the sender may be displayed in place of the email address and/or name of the sender. In other embodiments, the client may not display any information about the sender at all.

In block 810, the messaging system is capable of receiving a user input within a recipient field of the new message GUI. The recipient field may be a "To" field, a "CC" field, or a "BC" field. For example, the messaging system may receive one or more characters specifying a recipient. The user input may specify, at least in part, a name and/or an email address of the recipient.

In block 815, the messaging system is capable of searching for email address(es) that match the received user input. In one example, the messaging system may compare the characters received in the recipient field with email addresses within a list of avatar-email address pairs to determine which, if any, of the email addresses match the received user input. In another example, the messaging system may search contact records for names that match the received user input and determine the email addresses, if any, listed within the contact record(s). In another example, the messaging system may search contact records for email addresses that match the user input. In still another example, the messaging system may search a list of email addresses from sent and/or received email address (e.g., frequently used email addresses) that may not be in the list of avatar-email address pairs and/or for which contact records may not be created.

In block 820, the messaging system is capable of determining an avatar for each of the matching email addresses. In cases where the messaging system determines one or more matching email addresses from the list of avatar-email address pairs, the avatar(s) mapped to the matching email address(es) are selected for each matching email. In cases where the messaging system determines one or more matching email addresses within contacts and the email addresses are not mapped to avatars, the messaging system may use an image from the contact record if one exists.

In one embodiment, in cases where the messaging system determines that no avatar is mapped to one or more email addresses found to match the user input and no image from a contact record is found, the messaging system is capable of using a default avatar to represent the matching email address(es). In one aspect, the default avatar may be a system level default avatar. In another aspect, the messaging system may use a default avatar that is specific to a particular domain. In that case, responsive to determining that the data for the recipient field matches the domain, the messaging system uses the domain specific avatar for the matching email address.

In one or more embodiments, the messaging system is capable of generating an avatar. For example, in cases where a matching email address is not mapped to an avatar, but is found within a contact record, the messaging system may use the first letter of the name of the contact or initials of the contact. The messaging system may use the initial or initials of the contact as the avatar.

In cases where a matching email address is not mapped to an avatar and is not found within a contact record, the messaging system is capable of generating an avatar as described in greater detail below to avoid displaying email addresses. In one example, the messaging system is capable of displaying only the first character or first few characters of the email address instead of the entire email address as the avatar. In another example, the messaging system is capable of displaying only a portion of the unrecognized email address as an avatar. As an illustrative example, the messaging system is capable of displaying the first few characters followed by a "continuation delimiter" or wildcard, followed by the last few characters of the email address. Rather than displaying joe.smith@ibm.com, the client may display "jo . . . bm.com" as the avatar. In another example, the client is capable of displaying the first few characters of the user part of the email address followed by the email '@' delimiter character and only a portion of the domain part of the email address. As an illustrative example, the messaging system may display an avatar of "jo*@*bm.com" for the foregoing email address.

Since the email address for the avatar that is ultimately selected as the recipient for the email is actually stored within the messaging system, when the email is created, the messaging system utilizes the correct email address within the header for the email.

In block 825, the messaging system displays the avatars determined in block 820. For example, the avatars may be displayed within a list. The list may be displayed as described and shown in connection with FIG. 3. In one embodiment, the messaging system may use the aforementioned display mechanisms for purposes of disambiguating one avatar from another, e.g., disambiguating same default avatars from one another.

In block 830, the messaging system determines whether an avatar from the list is selected. If so, method 800 continues to block 835, where the messaging system uses the email address for the selected avatar as the recipient for the message and the selected avatar is displayed in the recipient field or proximate to a "To," a "CC," "BC," and/or other recipient label. FIG. 5 illustrates an example where selected avatars are shown for the recipient. If an avatar from the list is not selected, method 800 continues to block 840. The user can select any of the provided matches using a UI gesture or other input device.

In block 840, the messaging system determines whether a request for additional information for an avatar from the list is received. If so, method 800 continues to block 845. If not, method 800 loops back to block 810 to continue processing. For example, the messaging system is capable of detecting that a pointer or cursor or user touch input is hovering over an avatar. The avatar, for example, may not be immediately recognizable to the user. The hover operation, or other input for requesting additional information, may indicate that the user would like additional details about the avatar.

In block 845, the messaging system is capable of displaying additional information for the avatar. For example, the messaging system is capable of displaying the name associated with an avatar for which additional information is requested. The messaging system is capable of displaying the email address for the avatar for which additional information is requested. The messaging system is capable of displaying both a name and an email address. The particular information that is displayed and the manner of display as described in further detail below may be specified as one or more adjustable preferences for the messaging system.

Accordingly, the messaging system may display an email address and/or a name of the avatar. The messaging system may also use the different ways of displaying email addresses and/or names discussed herein as a mechanism for displaying additional correspondent data responsive to a user request to do so. When the messaging system no longer detects the hover over the avatar, the messaging system stops displaying the information (e.g., removes the information from the GUI).

In one aspect, the messaging system may perform blocks 810, 815, 820, and 825 on a per-keystroke basis. For example, method 800 may iterate so that for each keystroke or character input received, the matching avatar determination(s) are updated. As discussed, as user input is received, the particular characters specified are not displayed within the GUI or within the recipient field of the GUI. The avatars are updated without displaying received text and/or other characters.

For example, responsive to a user entering an email address or name to use, the messaging system is capable of not displaying the email address and/or name that may have been entered. The messaging system displays a graphical list of avatars matching the received user input. As the user continues to enter the address or name, the messaging system updates and/or fine-tunes the list of avatars is to display those avatar(s) that match the received input. For example, as the user types in the name and/or email address of a desired email recipient, the messaging system client only displays the avatars that match what has been entered as that continues to evolve on a per-character basis.

In accordance with one or more embodiments described herein, the displaying of email addresses and/or names within a UI and/or a GUI is avoided unless the user of the messaging system specifically wishes to see such information. This applies to both the entry of email addresses into new messages and to the actual displaying of emails and/or email contents when reading an email in a user's email file.

In another example embodiment, a messaging system uses static and/or dynamic avatars, e.g., pictorial representations, to preclude and prevent security leakages in a variety of email client implementations and/or email endpoints. For example, email address gathering may be prevented through the use of graphical avatars/proxies. A mapping of one or more email addresses to representations (e.g., avatars) is provided. The representations may be dynamic and support a user adjustment. For example, for each email address $A_i$ for a user Ui [or a group of users Gi] there is a representation Ri displayed instead of each email address Ai.

In another example, responsive to one or more user actions (e.g., user inputs), a messaging system displays information about the user Ui. The information may be the email address, each of the email addresses Ai of a group Gi, a name, a profile, and etc. In embodiments where the avatar is dynamic, the messaging system may change or animate the avatar based on context such as business versus personal or social.

In addition to the per-user configurations described herein, messaging system may be provided with default or "out-of-the-box" rules and avatars for different email domains. This can improve the user's experience when dealing with a user at another company or organization for whom the user does not yet have a custom avatar. For example, at a particular company, the administrators have configured default settings in clients for particular domains. An email address belonging to a particular domain, e.g., "ibm.com" would use a predetermined, default avatar for that domain at least until the user of the client begins assigning avatars to particular email addresses of the domain. Thus, any email sent to or received from the domain "ibm.com" would use the administrator assigned default avatar unless the user of the messaging system assigned a particular avatar to an email address within the domain. Internally, the client still uses email addresses and contact information (e.g., names). The messaging system may be configured, however, to replace names and/or email addresses as found in email headers, etc. with avatars when displayed in a GUI.

By not displaying email addresses or names unless the user requests such data items to be displayed, the ability of another user to clandestinely collect such data is greatly reduced. By not displaying email addresses or names in UIs, the messaging system provides users with increased privacy and security since personally identifiable email information is less likely to be stolen without their knowledge.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The terminology used herein is for the purpose of describing particular embodiments only and is not intended to be limiting. Notwithstanding, several definitions that apply throughout this document now will be presented.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As used within this disclosure, the term "avatar" means an icon, image, figure, graphic representation, and so forth representing a particular address for a user in an electronic message. In one embodiment, the address is an email address. In other embodiments, the address may be an address for another type of electronic communication such as text messaging, instant messaging, etc. The avatar may be dynamic, e.g., animated. The electronic message, or message, may be a posting to an Internet Website, e.g., a forum, discussion group, social networking platform, an email, an instant message (e.g., a text message), and so forth. As used within this disclosure, the phrase "only the avatar" means that the electronic mail address represented by the avatar is not displayed and that the name of the user of the electronic mail address is not displayed. As used within this disclosure, the phrase "message correlated with an electronic mail address" means that the electronic mail address is listed as a sender and/or a recipient of the message.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "program code," "software," "application," and "executable code" mean computer-readable program instructions. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship. As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer hardware system for securing information, comprising:
   a processor programmed to initiate executable operations including:
      displaying, within a user interface of an email client, a message body field of a message to be composed;
      receiving, within a recipient field of the user interface, an input from a user;
      internally storing the input and not displaying the input within the recipient field during the receiving;
      displaying, within the recipient field, a plurality of avatars corresponding to the input;
      receiving, within the recipient field of the user interface, a selection of one of the plurality of avatars as corresponding to the recipient of the message; and
      sending, to an electronic mail address mapped to the selected one of the plurality of avatars, the message, wherein
   the user interface displays, within the recipient field, the avatar of the electronic mail address in place of at least one of a name for the electronic mail address or the electronic mail address.

2. The system of claim 1, wherein the processor is further programmed to initiate executable operations comprising:
   responsive to a user input relative to a particular one of the plurality of avatars, displaying at least one of the name of the user of the electronic mail address or the electronic mail address associated with the particular one of the plurality of avatars.

3. The system of claim 1, wherein
   a plurality of electronic mail addresses are respectively mapped to the plurality of avatars.

4. The system of claim 1, wherein
   the user interface displays the message opened.

5. The system of claim 1, wherein
   the processor is further programmed to initiate executable operations comprising:
      first determining that the electronic mail address correlated with the message is not mapped to an avatar, and
      responsive to the first determining, generating a mapping by generating an avatar based on at least one of the electronic mail address or a name for the electronic mail address, and using the generated avatar for the electronic mail address.

6. The system of claim 1, wherein
   the user interface displaying, within the recipient field, the avatar of the electronic mail address in place of at least one of a name for the electronic mail address or the electronic mail address includes not displaying the name for the electronic mail address and the electronic mail address.

7. A computer program product, comprising:
   a computer readable storage medium having program code for securing information stored therein,
   the program code executable, which when executed by a computer hardware system, causes the computer hardware system to perform:
      displaying, within a user interface of an email client, a message body field of a message to be composed;
      receiving, within a recipient field of the user interface, an input from a user;
      internally storing the input and not displaying the input within the recipient field during the receiving;
      displaying, within the recipient field, a plurality of avatars corresponding to the input;
      receiving, within the recipient field of the user interface, a selection of one of the plurality of avatars as corresponding to the recipient of the message; and
      sending, to an electronic mail address mapped to the selected one of the plurality of avatars, the message, wherein
   the user interface is configured to display, within the recipient field, the avatar of the electronic mail address in place of at least one of a name for the electronic mail address or the electronic mail address.

8. The computer program product of claim 7, wherein the program code further causes the computer hardware system to perform:
   responsive to a user input relative to a particular one of the plurality of avatars, displaying at least one of the name of the user of the electronic mail address or the electronic mail address associated with the particular one of the plurality of avatars.

9. The computer program product of claim 7, wherein
   a plurality of electronic mail addresses are respectively mapped to the plurality of avatars.

10. The computer program product of claim 7, wherein the program code further causes the computer hardware system to perform:
   first determining that the electronic mail address correlated with the message is not mapped to an avatar, and
   responsive to the first determining, generating a mapping by generating an avatar based on at least one of the electronic mail address or a name for the electronic mail address, and using the generated avatar for the electronic mail address.

11. The computer program product of claim 7, wherein
   the user interface displaying, within the recipient field, the avatar of the electronic mail address in place of at least one of a name for the electronic mail address or the electronic mail address includes not displaying the name for the electronic mail address and the electronic mail address.

* * * * *